(12) United States Patent
Goto et al.

(10) Patent No.: US 7,778,776 B2
(45) Date of Patent: Aug. 17, 2010

(54) OBSTACLE AVOIDANCE METHOD AND OBSTACLE-AVOIDABLE MOBILE APPARATUS

(75) Inventors: Takanori Goto, Osaka (JP); Hajime Kawano, Osaka (JP)

(73) Assignee: Panasonic Corporation, Osaka (JP)

( * ) Notice: Subject to any disclaimer, the term of this patent is extended or adjusted under 35 U.S.C. 154(b) by 230 days.

(21) Appl. No.: 11/882,943

(22) Filed: Aug. 7, 2007

(65) Prior Publication Data

US 2008/0040040 A1    Feb. 14, 2008

(30) Foreign Application Priority Data

Aug. 8, 2006    (JP)    ............... 2006-215295
Jun. 28, 2007    (JP)    ............... 2007-170086

(51) Int. Cl.
    *G08G 1/16*    (2006.01)
(52) U.S. Cl. ............... 701/301; 342/70; 340/435
(58) Field of Classification Search ............... 701/301; 340/435, 903; 342/70
    See application file for complete search history.

(56) References Cited

U.S. PATENT DOCUMENTS

| 6,442,484 | B1* | 8/2002 | Miller et al. ............... 701/301 |
| 2003/0122701 | A1* | 7/2003 | Tran ............... 342/29 |
| 2004/0073368 | A1* | 4/2004 | Gonzalez-Banos et al. .. 701/301 |
| 2006/0126899 | A1* | 6/2006 | Nagaoka et al. ............... 382/103 |
| 2006/0244978 | A1* | 11/2006 | Yamada et al. ............... 356/614 |
| 2006/0282218 | A1* | 12/2006 | Urai et al. ............... 701/301 |

FOREIGN PATENT DOCUMENTS

| JP | 10-20916 | 1/1998 |
| JP | 2003-241836 | 8/2003 |

OTHER PUBLICATIONS

Takashi Tsubouchi et al., "Planning and navigation by mobile robot in the presence of multiple moving obstacles and their velocities", Journal of the Robotics Society of Japan, vol. 12, No. 7, 1994, pp. 1029-1037.

* cited by examiner

Primary Examiner—Mark Hellner
Assistant Examiner—Helal A Algahaim
(74) Attorney, Agent, or Firm—Wenderoth, Lind & Ponack, L.L.P.

(57) ABSTRACT

An obstacle avoidance method for mobile apparatus includes the steps of acquiring, by a mobile apparatus, information as to relative movement of an obstacle with respect to the mobile apparatus, calculating a travel path and a travel direction of the obstacle based on the information during its relative movement, setting a non-intrusion area having a configuration which is longer in the travel direction of the obstacle than in a direction perpendicular to the travel direction, and performing such travel control on the mobile apparatus as to avoid the non-intrusion area, by which obstacle avoidance operation is fulfilled. Thus, an obstacle avoidance method as well as an obstacle-avoidable mobile apparatus are provided which are capable of not only reducing collisions against obstacles and repetitions of avoidance operation, but also preventing impartment of uneasiness and oppression to persons in the obstacle avoidance operation for mobile apparatuses such as robots.

7 Claims, 14 Drawing Sheets

A VIEW SHOWING A PROBABILITY POTENTIAL FIELD OF AN OBSTACLE IN A COORDINATE SYSTEM

A VIEW SHOWING A PROBABILITY POTENTIAL FIELD WITH A SLOPE ADDED

OBSTACLE AVOIDANCE METHOD AND OBSTACLE-AVOIDABLE MOBILE APPARATUS

BACKGROUND OF THE INVENTION

1. Field of the Invention

The present invention relates to an obstacle avoidance function of mobile apparatuses such as robots and, more particularly, to a method for avoiding a traveling obstacle.

2. Description of the Related Art

Conventionally, there have been provided mobile apparatuses such as automatic carts and autonomous-travel automobiles, and devices capable of generating travel paths typified by manipulators of industrial robots. Some of these autonomous mobile apparatuses have a function of avoiding an obstacle present on a travel path, such as the following documents 1, 2 and 3.

Document 1: Japanese unexamined patent publication No. H10-20916

Document 2: Japanese unexamined patent publication No. 2003-241836

Document 3: Takashi TSUBOUCHI, Tomohide NANIWA, Suguru ARIMOTO, "planning and navigation by mobile robot in the presence of multiple moving obstacles and their velocities" Journal of the Robotics Society of Japan, Vol. 12, No. 7, 1994 (pp. 1029-1037).

Here are described related arts disclosed in Document 1, 2 and 3 with reference to FIGS. 10, 11A, 11B, 12A and 12B.

FIG. 10 is a schematic view showing an obstacle avoidance operation disclosed in Document 1. FIGS. 11A and 11B are schematic views showing an obstacle avoidance operation disclosed in Document 2, where FIG. 11A shows a probability potential field of an obstacle in a coordinate system and FIG. 11B shows a probability potential field with a slope added. Further, FIG. 12A is a schematic perspective view showing an obstacle avoidance operation disclosed in Document 3, and FIG. 12B is a schematic plan view showing an obstacle avoidance operation disclosed in Document 3.

Referring to FIG. 10, a mobile apparatus 510 disclosed in Document 1 defines, as an interference check block 520, a three-dimensional space of a specified environmental range within which the mobile apparatus is movable. The interference check block 520 is divided into sectors of an arbitrary size, and each of the sectors checks whether or not the sector interferes with an obstacle 530 on the travel course. Document 1 provides an obstacle avoidance method including the generation of a path for avoiding interference of the mobile apparatus 510 and the obstacle 530 with each other based on interference check results in the individual sectors of the interference check block 520 shown in FIG. 10.

Referring to FIGS. 11A and 11B, a mobile apparatus 610 disclosed in Document 2 is located on a space defined by three axes, probability density U, positions X and Y. The mobile apparatus 610 calculates probabilities by a two-dimensional normal distribution present at a next time point from past positional information of a travel obstacle 630 acquired by a sensor (not shown) mounted on the mobile apparatus to generate a probability potential field shown in FIG. 11A. Thereafter, the mobile apparatus adds a slope directed toward a target position in the generated probability potential field, and selects a path based on an inclination of the slope. More specifically, referring to FIG. 11B, out of travel paths ca and cb, the mobile apparatus 610 selects the travel path cb crossing across before the travel obstacle 630 if the slope of the travel path cb up to the target position is steeper than the slope of the travel path ca. Document 2 provides an obstacle avoidance method for searching for a path directed toward a target position based on an inclination of the probability potential field sloped as shown in FIG. 11B.

Referring to FIGS. 12A and 12B, a mobile apparatus 710 disclosed in Document 3 is located on a space having three axes, time T, positions X and Y. The mobile apparatus 710 estimates a velocity vector of a travel obstacle 730 from information acquired by a sensor (not shown) mounted on the mobile apparatus. Thereafter, the mobile apparatus 710 regards a locus of the travel obstacle 730 predicted from the estimated velocity vector as an oblique circular cylinder 740 on a space-and-time coordinate system to select, out of path candidates A1, A2 for avoiding the 740, a path that provides earlier arrival time to a target position.

More specifically, referring to FIG. 12B, out of the travel paths A1 and A2, if the arrival time by the travel path A2 is earlier than the arrival time by the travel path A1, then the mobile apparatus 710 selects the travel path A2 that intersects a forward side of the travel obstacle 730 as viewed in its travel direction. Document 3 provides a method for avoiding an obstacle on the basis of a path selected as shown in FIGS. 12A and 12B.

SUMMARY OF THE INVENTION

In the related-art described above, avoidance operation is achieved without considering a travel direction of the obstacle, this results in a possibility that the mobile apparatus directs the avoidance operation toward the same direction as the travel direction of the obstacle. This leads to such issues as collision between the mobile apparatus and an obstacle or repetition of avoidance operation of the mobile apparatus.

Further, prior-art configurations in which travels of the obstacle are stacked on the time series, travel paths of the obstacle may fill out the space depending on the travel state of the obstacle, causing an issue that the mobile apparatus is disabled from traveling.

For example, with the obstacle avoidance method shown in FIGS. 12A and 12B, out of the travel paths A1(0) and A2(0), the mobile apparatus 710, as shown in FIG. 12B, selects the A2(0) that travels across before the obstacle if the arrival time by the travel path A2(0) is earlier than that by the travel path A1(0). Therefore, depending on the velocity of the travel obstacle 730, the mobile apparatus 710 is highly likely to collide with the travel obstacle 730. Also, because the mobile apparatus 710 selects the fastest path every unit time, the apparatus selects the travel paths A2(1), A2(2) sequentially, so that the mobile apparatus 710 continues avoiding the travel obstacle 730, causing a possibility that the device does not arrive at an arrival point DP.

Further, in the case where the obstacle is a person, the mobile apparatus not only crosses her progress direction to disturb her progress, but also can invade into a space, advocated by the proxemics theory, which is felt uncomfortable if another person or object has entered thereinto, resulting in the issue that the mobile apparatus may impart uneasiness or oppression to the person.

Accordingly, an object of the present invention addressing the above-described issues, is to provide an obstacle avoidance method, as well as an obstacle-avoidable mobile apparatus, which, in obstacle avoidance operation the mobile apparatus, such as a robot, reduces collisions with an obstacle, as well as repetitions of avoidance operation, but also does not impart uneasiness or oppression to people.

According to a first aspect of the present invention, there is provided an obstacle avoidance method for mobile apparatus, comprising:

acquiring, by a mobile apparatus, information as to relative movement of an obstacle with respect to the mobile apparatus;

calculating a travel path and a travel direction of the obstacle based on the information;

setting, around the obstacle, a first area having a configuration which is longer in the travel direction of the obstacle than in a direction perpendicular to the travel direction; and performing, by the mobile apparatus, such travel control as to avoid the first area.

According to a second aspect of the present invention, there is provided the obstacle avoidance method for mobile apparatus as defined in the first aspect, wherein the acquisition of the information as to the relative movement of the obstacle is fulfilled by sensing a relative distance, a relative velocity and a relative direction with respect to the obstacle by a sensor mounted on the mobile apparatus.

According to a third aspect of the present invention, there is provided the obstacle avoidance method for mobile apparatus as defined in the first aspect, wherein the first-area avoidance travel by the mobile apparatus is fulfilled by calculating path lengths of a forward-side path and a rearward-side path, respectively, of the travel direction of the obstacle and selecting a path that is the shorter in path length.

According to a fourth aspect of the present invention, there is provided the obstacle avoidance method for mobile apparatus as defined in the first aspect, wherein the first-area avoidance travel by the mobile apparatus is fulfilled by calculating path lengths of a forward-side path and a rearward-side path, respectively, of the travel direction of the obstacle, and when the forward-side path and the rearward-side path are equal in path length, the rearward-side path is selected.

According to a fifth aspect of the present invention, there is provided the obstacle avoidance method for mobile apparatus as defined in the first aspect, further comprising:

deciding whether or not a direction in which the obstacle acquires image information is directed toward the mobile apparatus;

if it is decided that the direction of acquisition of image information is directed toward the mobile apparatus, changing a longitudinal direction of the first area to the direction toward the mobile apparatus to re-set the first area.

According to a sixth aspect of the present invention, there is provided the obstacle avoidance method for mobile apparatus as defined in the first aspect, further comprising: changing a ratio of a length of the first area in the travel direction to a length thereof in a direction perpendicular to the travel direction according to a velocity of the obstacle.

According to a seventh aspect of the present invention, there is provided the obstacle avoidance method for mobile apparatus as defined in the sixth aspect, wherein the length in the travel direction is increased relative to the perpendicular direction as the velocity of the obstacle increases.

According to an eighth aspect of the present invention, there is provided an obstacle-avoidable mobile apparatus comprising:

a relative movement information acquisition unit for acquiring information as to relative movement of an obstacle with respect to a mobile apparatus;

a first area setting unit for setting a first area having a configuration which is longer in a travel direction of the obstacle than in a direction perpendicular to the travel direction by calculating a travel path and a travel direction of the obstacle based on the information acquired by the relative movement information acquisition unit; and a travel control unit for exerting travel control on the mobile apparatus so that the first area set by the first area setting unit is avoided.

According to a ninth aspect of the present invention, there is provided the obstacle-avoidable mobile apparatus as defined in the eighth aspect, wherein the relative movement information acquisition unit includes a sensor for detecting a relative distance, a relative velocity and a relative direction with respect to the obstacle as information as to the relative movement.

According to a tenth aspect of the present invention, there is provided the obstacle-avoidable mobile apparatus as defined in the eighth aspect, wherein the information as to the relative movement acquired by the relative movement information acquisition unit contains information as to a velocity of the obstacle, and the first area setting unit sets the first area by changing a ratio of a length of the first area in the travel direction to a length thereof in a direction perpendicular to the travel direction according to the information as to the velocity of the obstacle.

According to an eleventh aspect of the present invention, there is provided the obstacle-avoidable mobile apparatus as defined in the tenth aspect, wherein the first area setting unit sets the first area so that the length in the travel direction is increased relative to the perpendicular direction as the velocity of the obstacle increases.

As shown above, according to the obstacle avoidance method of the present invention, a non-intrusion area (first area) which is a space elongated along a travel direction of the obstacle is set around the obstacle. Then, the mobile apparatus performs travel control for avoiding the non-intrusion area. Thus, there can be provided an obstacle avoidance method by which not only the prevention of collisions between the mobile apparatus and obstacles as well as the reduction of repetitions of avoidance operation can be realized, but also which, given an obstacle that is a person, gives neither uneasiness nor oppression to the person, and also provided an obstacle-avoidable mobile apparatus by which such avoidance operation as described above can be implemented.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
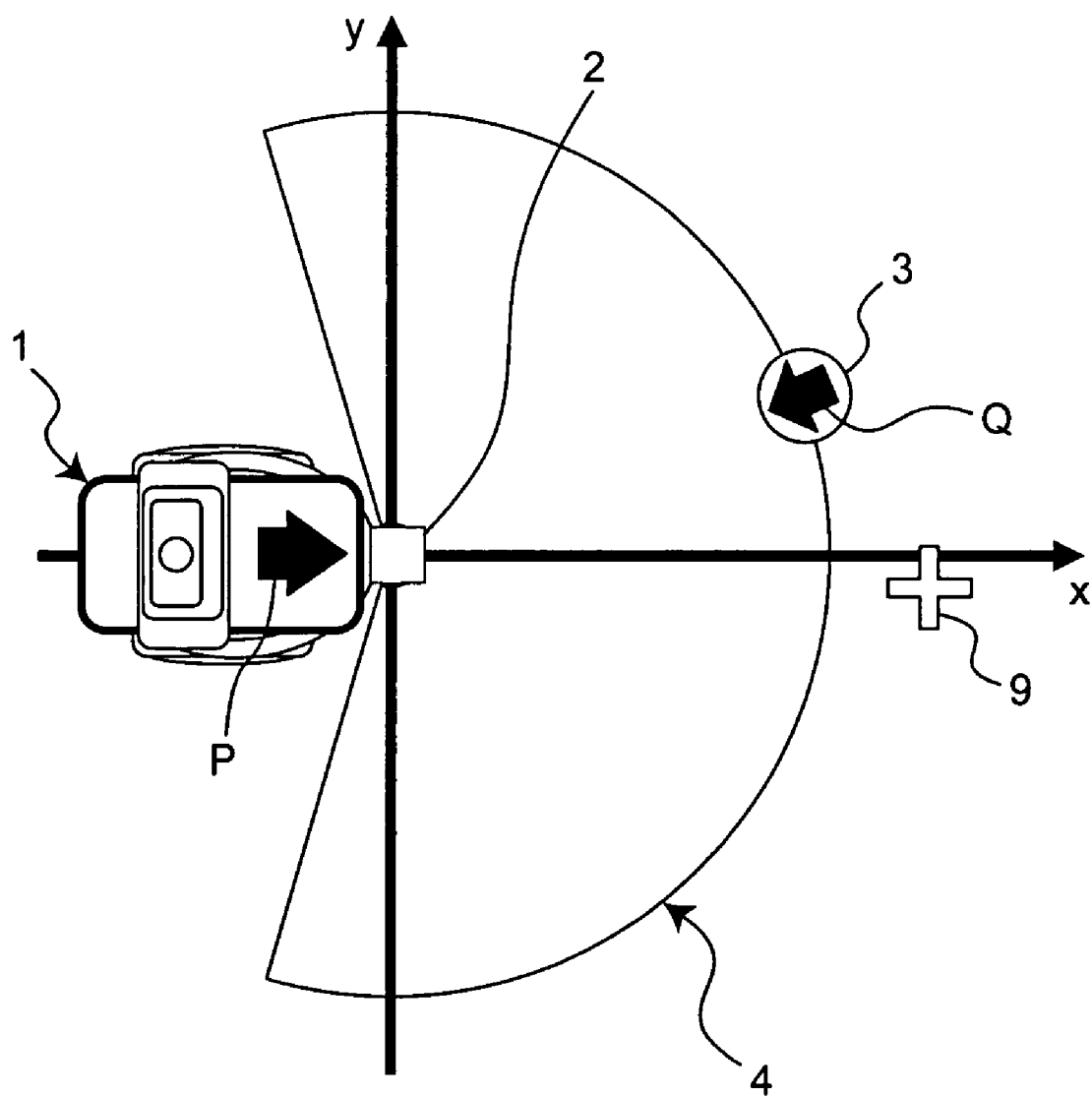
FIG. 1 is a schematic view of an obstacle avoidance method according to Embodiment 1 of the present invention.

Before the description of the present invention proceeds, it is to be noted that like parts are designated by like reference numerals throughout the accompanying drawings.

Hereinbelow, embodiments of the present invention will be described in detail with reference to the accompanying drawings.

Embodiment 1

FIG. 1 is a schematic view of an obstacle avoidance method according to Embodiment 1 of the present invention.

Referring to FIG. 1, a mobile apparatus 1 is a robot which includes a distance sensor 2 and which has a traveling function of traveling to a target position 9 while avoiding an obstacle 3 that is traveling on a travel course of the mobile apparatus 1. The mobile apparatus 1, having a sensing area 4 on its forward side, travels while keeping the sensing of the sensing area 4 by the distance sensor 2. When it is detected by the distance sensor 2 that the obstacle 3 is present within the sensing area 4, the mobile apparatus 1 keeps traveling while avoiding the obstacle 3. It is noted that although the sensing area 4 is provided on the forward side of the mobile apparatus 1 in this Embodiment 1, the sensing area may also be provided as an omnidirectional area around the mobile apparatus 1 instead of the above case. In addition, FIG. 1 is a schematic view showing, on a plane, a positional relation between the mobile apparatus 1 and the obstacle 3 which are traveling relative to each other, showing a state that the mobile apparatus 1 is traveling in a travel direction P while the obstacle 3 is traveling in a travel direction Q.

Figure 2A:
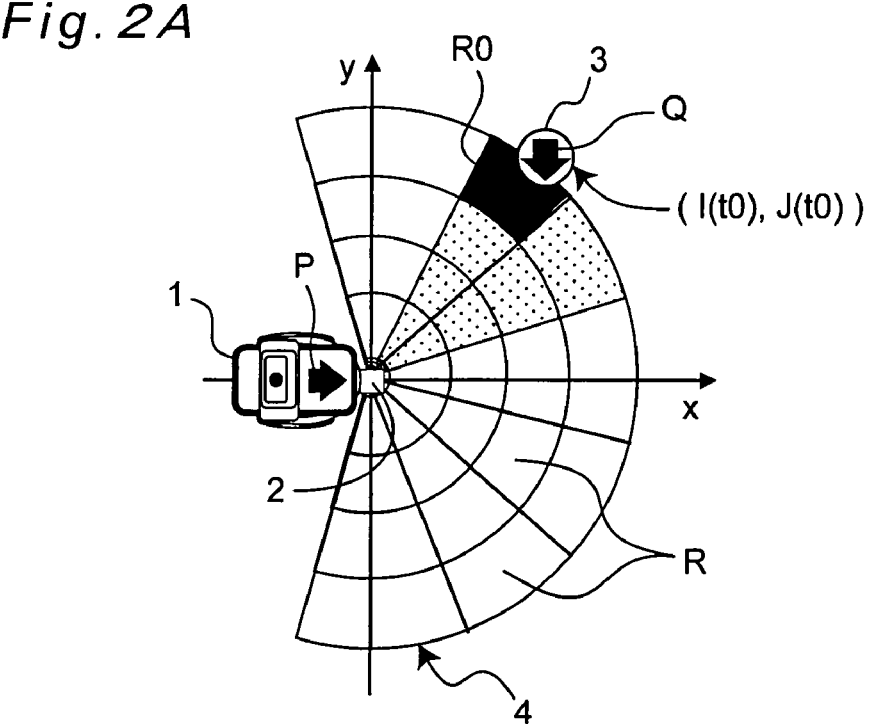
FIG. 2A is a schematic view showing a positional relation between an obstacle and the mobile apparatus at a time t0 of Embodiment 1.
Figure 2B:
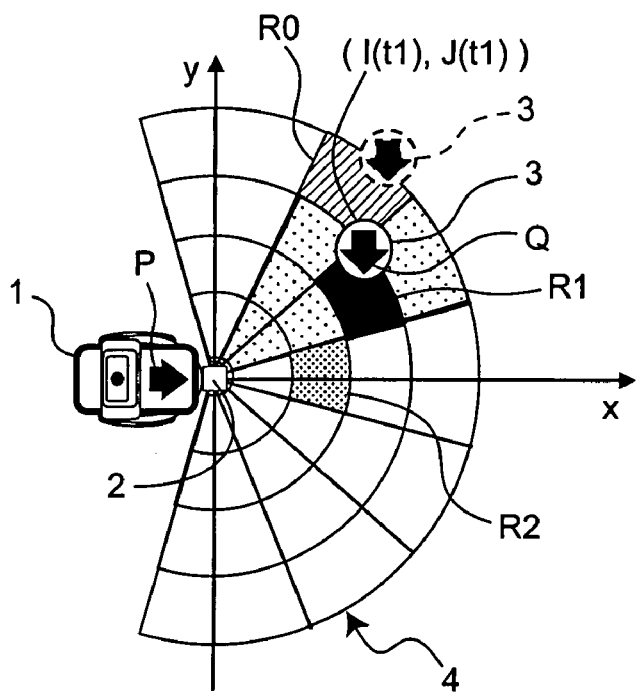
FIG. 2B is a schematic view showing a positional relation between an obstacle and the mobile apparatus at a time t1 of Embodiment 1.
Figure 2C:
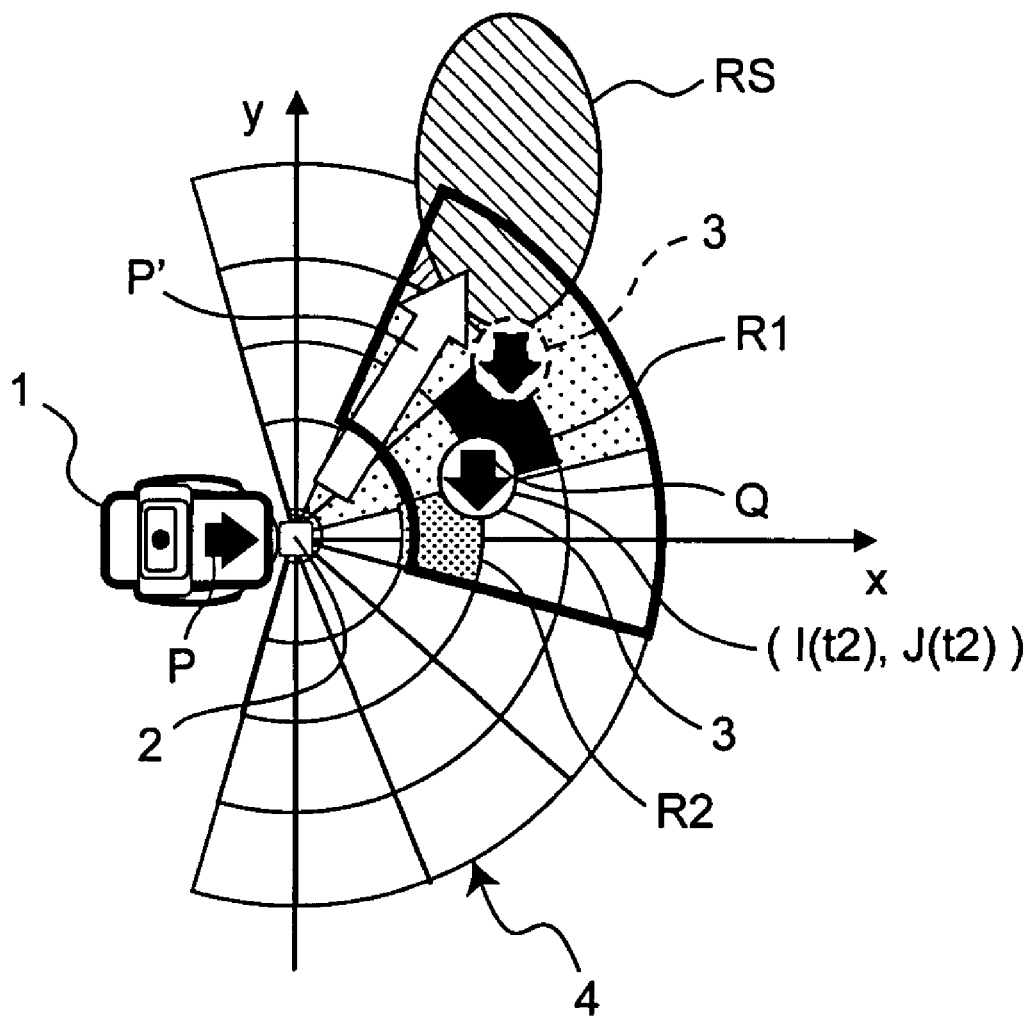
FIG. 2C is a schematic view showing a positional relation between an obstacle and the mobile apparatus at a time t2 of Embodiment 1.

FIGS. 2A, 2B and 2C are schematic views for explaining contents of the obstacle avoidance method of this Embodiment 1, respectively, by the positional relation between an obstacle and the mobile apparatus. FIG. 2A shows a positional relation between the obstacle and the mobile apparatus at time t0, FIG. 2B shows a positional relation between the obstacle and the mobile apparatus at time t1, and FIG. 2C shows a positional relation between the obstacle and the mobile apparatus at time t2. It is noted here that the times t0, t1 and t2 satisfy a relationship that t0<t1<t2.

As shown in FIGS. 2A, 2B and 2C, the sensing area 4 formed on the forward side of the mobile apparatus 1 is divided into areas R of an arbitrary size. The distance sensor 2 mounted on the mobile apparatus 1 fulfills the sensing function to detect whether or not the obstacle 3 is present within the individual areas R. More specifically, in a state of time t0 shown in FIG. 2A, coordinates at which the obstacle 3 is present are assumed as (I(t0), J(t0)), and the area in which these coordinates are contained is assumed as R0. It is also assumed that the mobile apparatus 1 is traveling along the travel direction P while the obstacle 3 is performing uniform linear motion along the travel direction Q.

In a state of time t1 at which a specified time has elapsed since the state of time t0 as shown above, as shown in FIG. 2B, the obstacle 3 has moved relative to the mobile apparatus 1 so as to be located at coordinates (I(t1), J(t1)). It is noted that an area in which these coordinates are contained is assumed as R1. Since the obstacle 3 is performing uniform linear motion, using a time-base variation of the coordinates of the presence of the obstacle 3 from the time t0 to t1 makes it possible to predict coordinates (I(t2), J(t2)) of presence of the obstacle 3, i.e. area R2, resulting when it thereafter comes to time t2. With the use of such a technique, it becomes implementable to perform the travel control by the mobile apparatus 1 so as to avoid interference with the obstacle 3 while predicting a travel position of the obstacle at the unreached time t2. For example, when it is predicted that the obstacle 3 will be located in the area R2, i.e. at a position on the travel direction P of the mobile apparatus 1, at the time t2 as shown in FIG. 2C, the travel direction P of the mobile apparatus 1 can be changed to P' so that the mobile apparatus 1 travels toward a safety area RS that allows interference with the obstacle 3 to be avoided, thus being enabled to fulfill an avoidance operation.

The obstacle avoidance method of this Embodiment 1 will be described in more detail in reference to an exemplary case where the obstacle 3 is a person. As shown in the schematic view of FIG. 3A, a collision preventing area G1 is first set around the person 3 as a safety area for reliably preventing collision (contact) between the obstacle (person) 3 and the mobile apparatus 1. This collision preventing area G1 is an area for preventing collisions of the obstacle 3 in all directions therearound with the mobile apparatus 1. For example, the area is set as a circular-shaped area having a diameter D centered on the center of gravity of the obstacle 3 as shown in FIG. 3A.

Figure 3A:
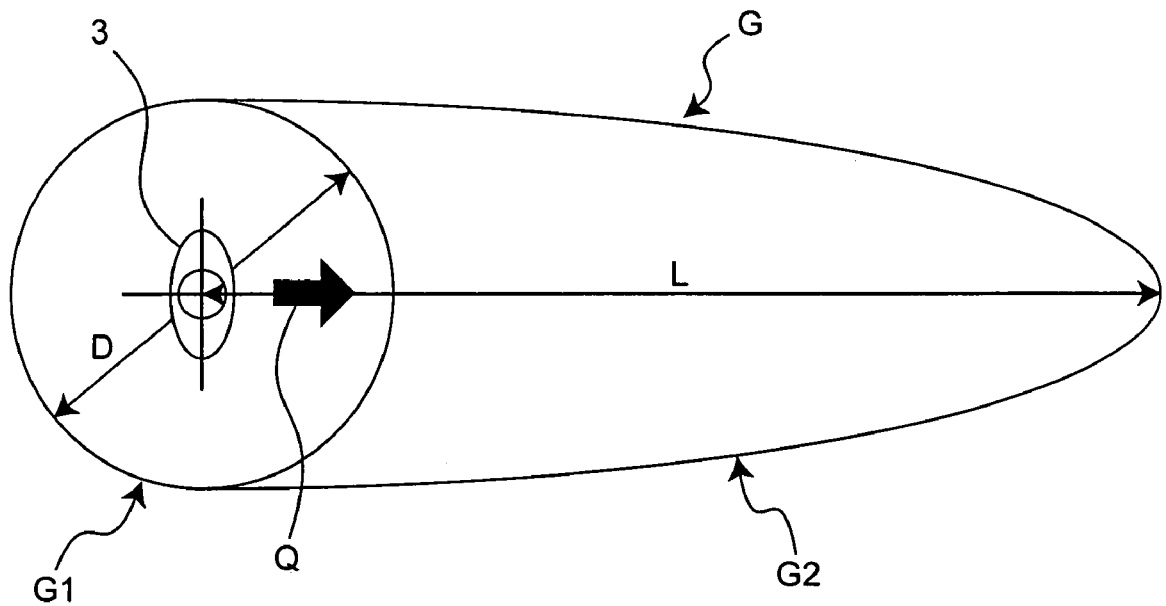
FIG. 3A is a schematic view showing a non-intrusion area in the obstacle avoidance method of Embodiment 1.

Further, as shown in FIG. 3A, a person's conscious area G2 is set around the obstacle 3 by referencing the center of gravity of the obstacle 3 with respect to the predicted travel direction Q of the obstacle 3. This person's conscious area G2 is an area which is set by taking into consideration that when the mobile apparatus 1 has intruded into this area G2, a person may bear the feeling of uneasiness or oppression so that a travel of the mobile apparatus 1 may affect a move of the person. As Embodiment 1 is intended for a case in which the obstacle 3 is a person as an example, the conscious area G2 serves as an example of the travel-effect preventing area. In addition, the obstacle 3, without being limited to a person, includes cases of mobile robots that travel by autonomous control, such as humanoid robots. In such a case, the conscious area G2 varies depending on the type of the obstacle.

As an area including such a collision preventing area G1 and a person's conscious area G2 as shown above, a non-intrusion area (first area) G for inhibiting the intrusion of the mobile apparatus 1 is set around the obstacle 3 as shown in FIG. 3A.

As to the method of setting such a non-intrusion area G, here is given a concrete explanation below with reference to the schematic views of FIGS. 3A and 3B and Equations (1) and (2).

Figure 3B:
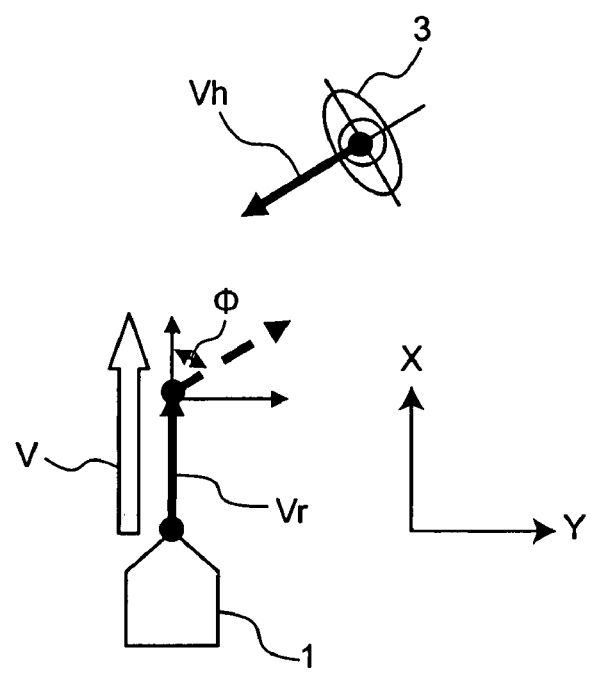
FIG. 3B is a schematic view for explaining the non-intrusion area of FIG. 3A.

First, X and Y axes are defined as shown in FIG. 3B. The mobile apparatus 1 travels toward the positive direction of the X axis. Then, the non-intrusion area G can be set by using the following Equations (1), (2) and (3):

$$L = aV + b (b \leq L \leq -4) \quad (1)$$

where $V = |Vr| + |Vh| \times \cos \phi$ and the individual values in Equation (1) are given in the unit of m.

Vr represents the travel velocity vector of the mobile apparatus 1, while Vh represents the travel velocity vector of the obstacle 3. It also holds that $\phi = \cos^{-1}\{(Vr \cdot -Vh)/|Vr||Vh|\}$.

$$y = \pm \sqrt{\ln\left(\left(\frac{x}{L}\right)^{-2\sigma^2}\right)} \quad (2)$$

$$x^2 + y^2 = b^2 \quad (3)$$

Now, assuming that Equation (2) and Equation (3) have points of intersection and that the points of intersection are X0 and X1 (X0≦X1), and if x≦X1, then a relationship of Equation (4) below holds:

$$y \leq \pm \sqrt{\ln\left(\left(\frac{x}{L}\right)^{-2\sigma^2}\right)} \quad (4)$$

if x≧X1, then a relationship of Equation (5) below holds:

$$x^2 + y^2 \leq b^2 \quad (5)$$

where L(meters) represents a length from the person's center of gravity to a fore end of the non-intrusion area G, while V(meters/seconds) represents a relative velocity of the mobile apparatus 1 with respect to the obstacle 3 in the X-axis direction. Also, 'a' and 'b' are factors which are set within ranges of a=1.8 to 2.2 and b=0.5 to 1.5, where σ≧0.09.

As shown above, the non-intrusion area G is set in consideration of the relative movement relationship between the obstacle 3 and the mobile apparatus 1 as well as the travel velocity and travel direction of the obstacle 3. The non-intrusion area G to be set in this way is set as an area having a configuration which is longer in the forward direction along the travel direction Q of the obstacle 3 than in a direction perpendicular to the travel direction Q (than in the widthwise direction). In order to avoid the set non-intrusion area G, the mobile apparatus 1 selects the shortest travel path, thus accomplishing avoidance control against the obstacle 3.

In this connection, in the setting of the non-intrusion area G including a space that a person as the obstacle 3 feels uneasiness, i.e., the person's conscious area G2, the area to be avoided (non-intrusion area G) may be changed according to changes in biological signals, such as person's myoelectric potential, heart sound, blood pressure and brain waves, which are measured as reference criterion for decision of a person's psychological state. For instance, the non-intrusion area G may be changed so as to become relatively smaller for a case that a person's psychological state is relatively stable, to become relatively large for another case that a person's psychological state is relatively unstable. Further, the range to be set for the area may be changed depending on the size of the obstacle.

Figure 4A:
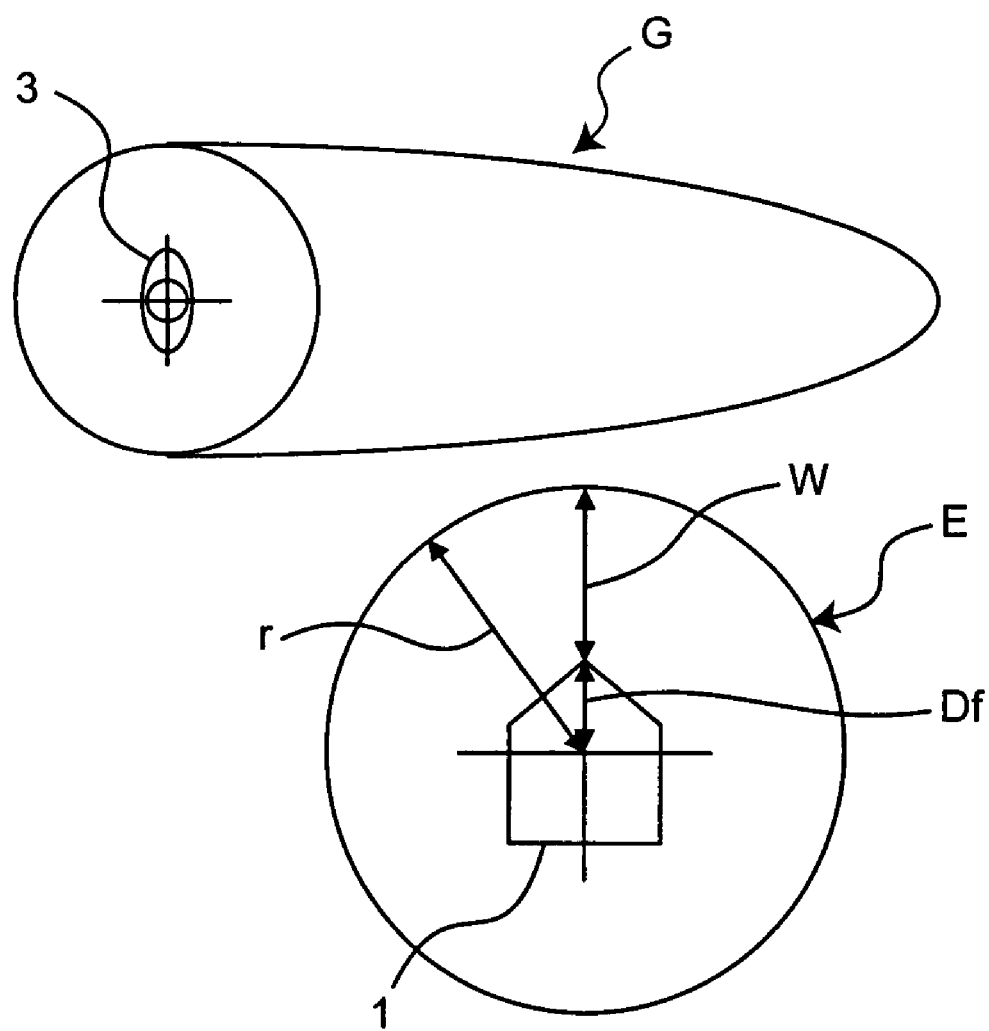
FIG. 4A is a schematic view showing a stop range of the mobile apparatus of Embodiment 1.
Figure 4B:
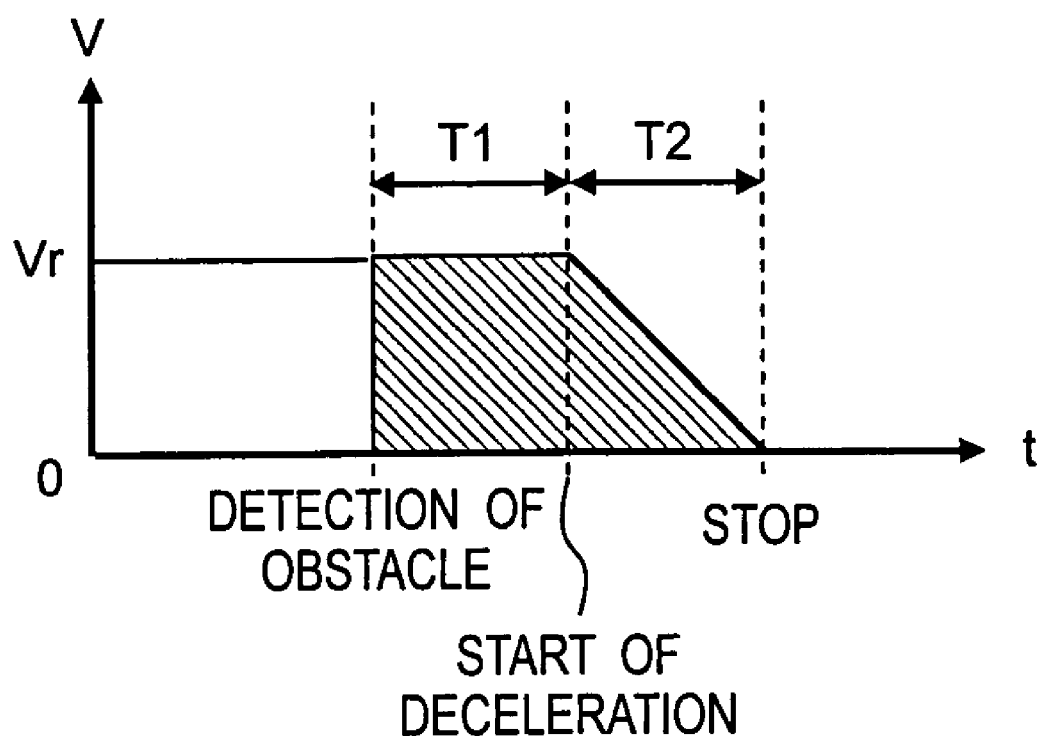
FIG. 4B is a schematic view for explaining the stop range of FIG. 4A.

Further, setting a stop range E in consideration of a braking distance W of the mobile apparatus 1 as shown in FIG. 4A makes it possible to perform such control that the mobile apparatus 1 is stopped when the non-intrusion area G and the stop range E interfere with each other. Such a stop range E can be set by using the braking distance W of the mobile apparatus 1 and a distance Df from the fore end portion of the mobile apparatus 1 to its center of gravity, where with a radius set as W+Df=r, an area having the radius r centered on the center of gravity of the mobile apparatus 1 can be set as the stop range E. In this connection, a graph showing the relationship between the velocity of the mobile apparatus 1 and the time elapsing until a braking stop is shown in FIG. 4B. As shown in FIG. 4B, time T1 is required for control processing or the like from detection of interference between the stop range E of the mobile apparatus 1 traveling at a travel velocity Vr and the non-intrusion area G for the obstacle 3, until start of deceleration of the mobile apparatus 1, and thereafter, at a time point after elapse of further time T2, the mobile apparatus 1 is stopped. The stop range E is preferably set by taking into consideration such time T1 required for control processing or the like, braking distance W, the size of the mobile apparatus 1 or the like. It is noted that the braking distance W may be set, for example, as W=Vr×T1+Vr×T2×0.5.

Figure 5:
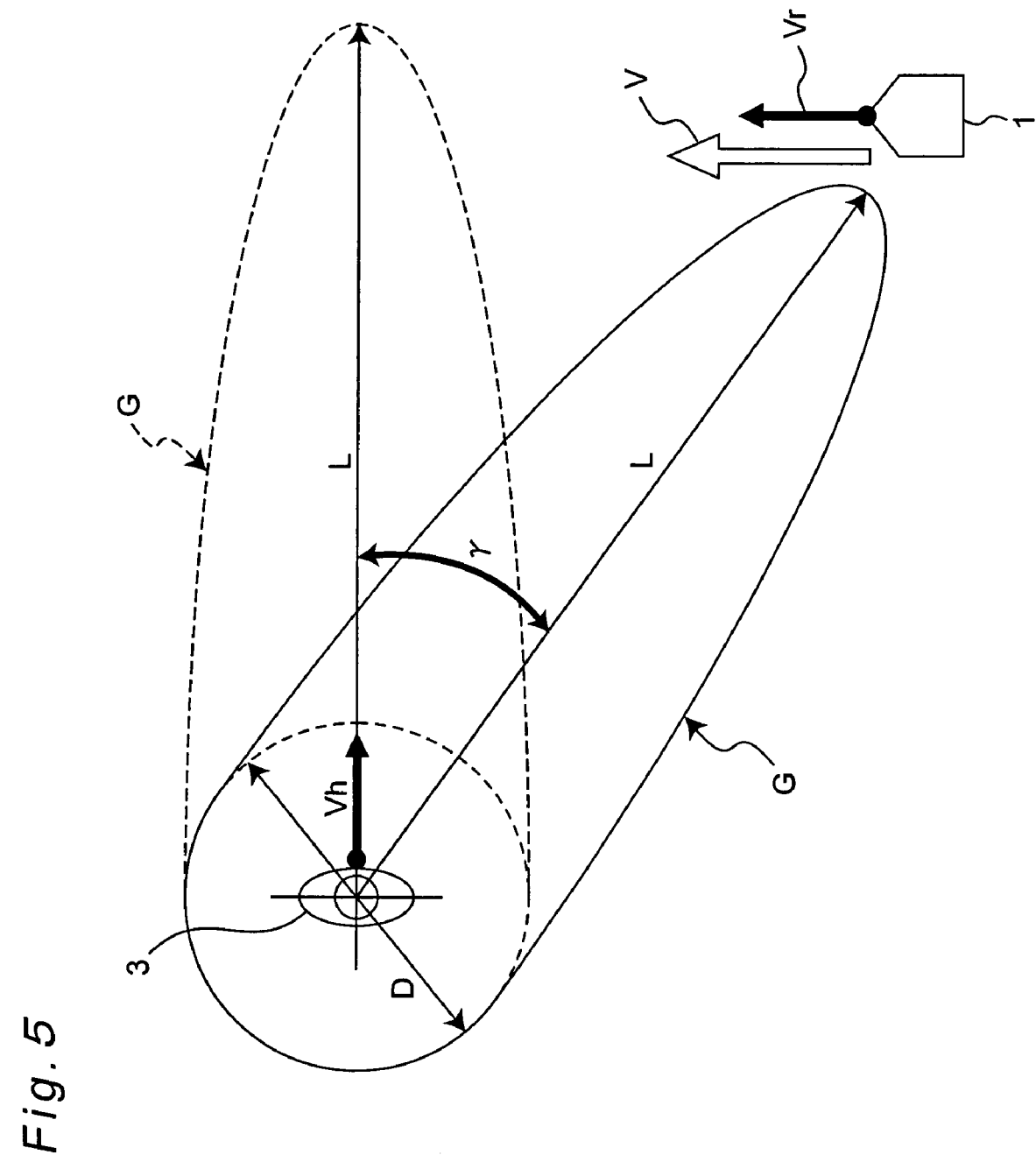
FIG. 5 is a schematic view showing a change in the non-intrusion area of Embodiment 1.

Furthermore, when it is decided that the face or eyes of a person as the obstacle 3 are directed toward the mobile apparatus 1, a non-intrusion area Gd may be set by rotation to an angle of y toward the mobile apparatus 1 with the obstacle 3 taken as a center, as shown in FIG. 5. By setting (or resetting) the non-intrusion area G according to the person's face or direction of the eyes like this, the person's conscious area that varies according to the direction of his/her eyes can be reflected on the non-intrusion area G more accurately. Thus, the non-intrusion area G can be set even in consideration of the direction in which a person acquires visual information, so that an avoidance method for mobile apparatuses that imparts no uneasiness to persons can be implemented. In this case, the method for detecting a person's face or direction of the eyes may be given, for example, by image recognition by camera or biological signal recognition by human myoelectric potential or the like. In the case where the obstacle 3 is, for example, a humanoid robot having a function of acquiring image information as to its ambient environment and, based on the acquired information, performing its travel control, it is also possible that after the mobile apparatus 1 detects a direction in which the humanoid robot acquires image information as to the ambient environment, the non-intrusion area G is set so that the longitudinal direction of the non-intrusion area G is aligned with the direction of the acquisition.

Next, the obstacle avoidance method of the mobile apparatus 1 in this Embodiment 1 is explained. For this explanation, schematic views for explaining the decision criterion of the obstacle avoidance method of Embodiment 1 are shown in FIGS. 6A and 6B.

Figure 6A:
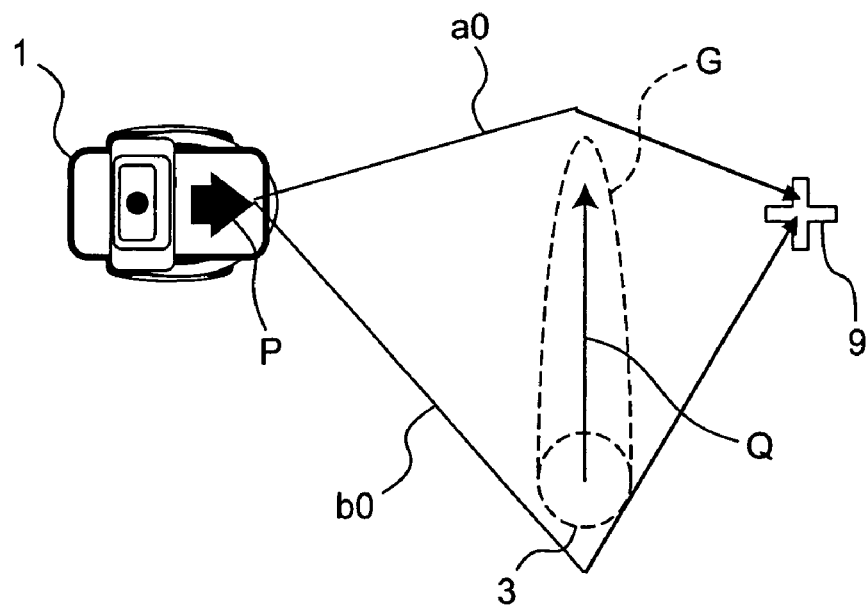
FIG. 6A is a schematic view showing a decision criterion (time t0) in the obstacle avoidance method of Embodiment 1.

Referring to FIG. 6A, first, avoidance paths (travel courses) a0, b0 from the mobile apparatus 1 at time t=t0 to a target position 9 are calculated from conditions inputted in the mobile apparatus 1. It is noted here that the avoidance path a0 is a path for avoiding the non-intrusion area G on the forward side of the travel direction Q of the obstacle 3, while the avoidance path b0 is a path for avoiding the non-intrusion area G on the rearward side of the travel direction Q of the obstacle 3. Thus, after the two avoidance paths a0, b0 have been calculated, one path that is the shorter in the distance from the avoidance path a0, b0 to the target position 9 is selected, and the mobile apparatus 1 travels along the selected avoidance path a0. After this on, the calculation of avoidance paths is executed in specified time intervals, and with the shorter-distance path selected, the traveling of the mobile apparatus 1 is continued.

Figure 6B:
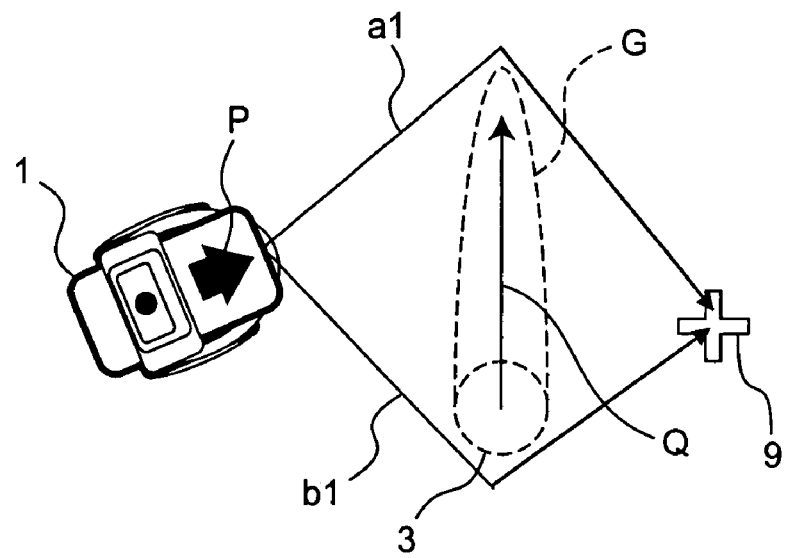
FIG. 6B is a schematic view showing a decision criterion (time t1) in the obstacle avoidance method of Embodiment 1.

At time t=t1(t1>t0), if calculated two avoidance paths a1, b1 are equal in distance to each other as shown in FIG. 6B, the avoidance path b1, which is the rearward side path of the travel direction Q of the obstacle 3, is selected, followed by traveling of the mobile apparatus 1 directed to the target position 9. Thus, in the case where calculated paths are equal in distance to each other, selecting not a forward side path but a rearward side path of the travel direction of the obstacle 3 makes it possible to keep the mobile apparatus 1 from entering into the field of view of a person (obstacle) as much as possible. As a result, psychological uneasiness or oppression that the person may bear can be reduced.

Figure 7:
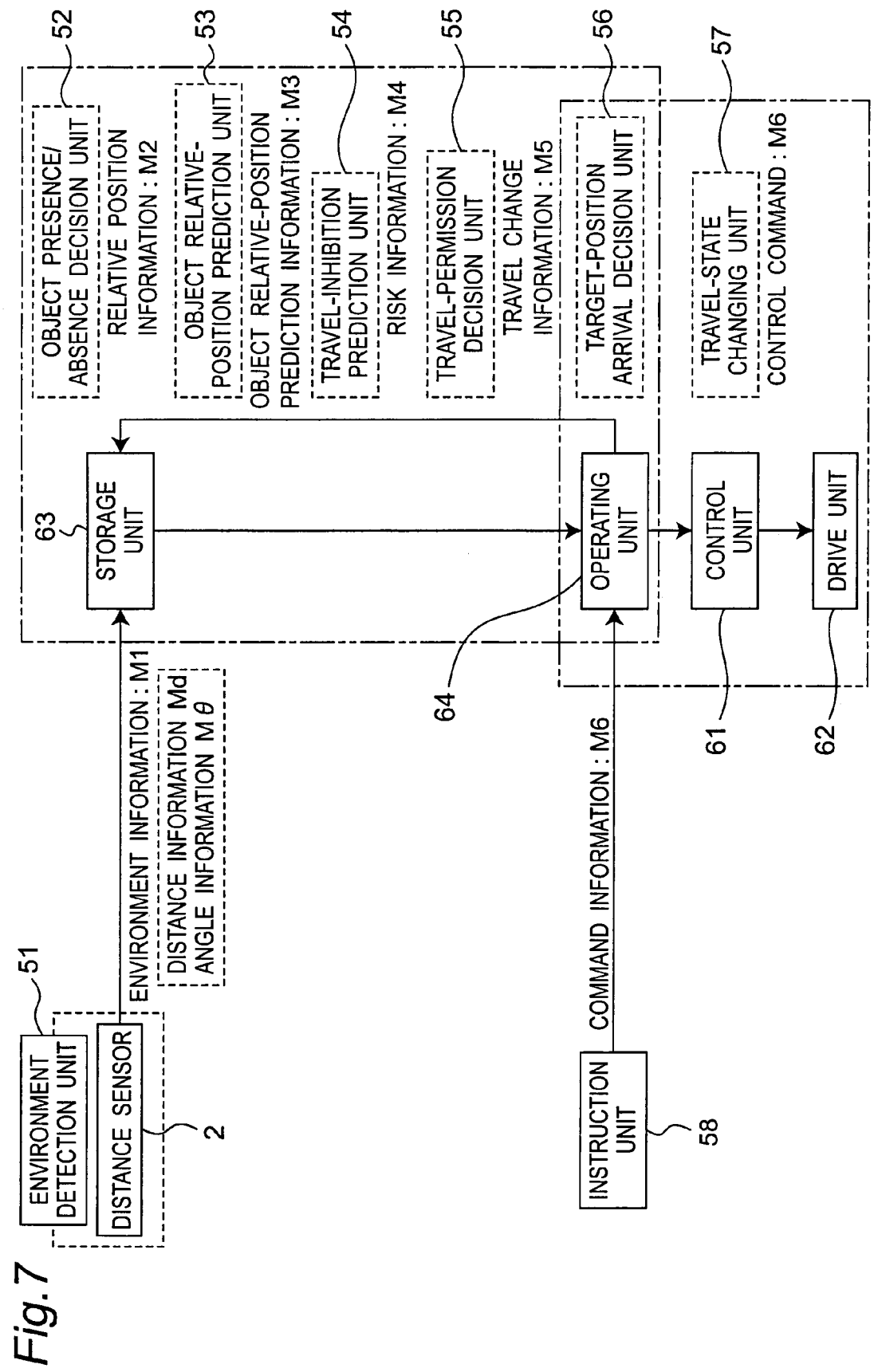
FIG. 7 is a block diagram of information processing in the mobile apparatus.

FIG. 7 shows a block diagram of information processing in the mobile apparatus 1.

As shown in FIG. 7, the mobile apparatus 1 includes a distance sensor 2 as an environment detection unit 51 for fulfilling the sensing of an ambient environment. Also, distance information Md and angle information M0 as to a detection space obtained from the environment detection unit 51 are assumed as environment information M1.

An object presence/absence decision unit 52 is a device for deciding the presence or absence of an obstacle 3 based on acquired environment information M1. The object presence/absence decision unit 52 has a function of creating information M2, given that coordinates (radial direction number I, concentric direction number J) of a divisional area R (see FIGS. 2A to 2C) in which the obstacle 3 is present is assumed as relative position information M2 (information (relative distance, relative velocity, and relative direction) relating to relative movement of the obstacle with respect to the mobile apparatus) as to the obstacle 3. In the mobile apparatus 1 of this Embodiment 1, the environment detection unit 51 and the object presence/absence decision unit 52 function as a relative movement information acquisition device.

An object relative-position prediction unit 53 is a device which, based on the relative position information M2 created by the object presence/absence decision unit 52, predicts changes in the relative positions of the obstacle 3 and the mobile apparatus 1 and calculates and creates object relative-position prediction information M3.

A travel-inhibition prediction unit 54 is a device which predicts a risk of disturbance for the mobile apparatus' 1 travel from the relative position information M2 and the object relative-position prediction information M3, and calculates and creates risk information M4.

A travel-permission decision unit 55 is a device which, when disturbance for the travel of the mobile apparatus 1 is predicted based on the risk information M4, calculates travel change information M5 as control information for avoiding an obstacle on the travel course by changing a travel state such as turn or acceleration/deceleration in the travel of the mobile apparatus 1.

A target-position arrival decision unit 56 is a device for deciding whether or not the mobile apparatus 1 has arrived at a target position.

A travel-state changing unit 57 is a device for changing the travel state of the mobile apparatus 1 by inputting the travel change information M5 into a control unit 61 and, from this control unit 61, outputting a control command M6 to a drive unit 62, which drives a traveling mechanism of the mobile apparatus 1 such as wheels, so as to avoid a risk of disturbance for the travel of the mobile apparatus 1. In addition, such a traveling mechanism is not limited to, for example, a mechanism using wheels or the like, but may also be an ambulatory mechanism or the like. In this Embodiment 1, the travel-permission decision unit 55, the travel-state changing unit 57 and the control unit 61 function as a travel control device.

Further, the mobile apparatus 1 includes an instruction unit 58 for commanding a target position, a storage unit 63 for storing therein acquired various types of information, and an operating unit 64 for calculating the position and velocity of the mobile apparatus 1 or the configuration and travel velocity of the obstacle 3 on the travel course from the acquired information, or the like. It is noted that information outputted from the instruction unit 58 is assumed as command information M6. Also, the position and velocity of the mobile apparatus 1 may be calculated from odometry information using encoder information, for example, when a wheel mechanism is used.

Figure 8:
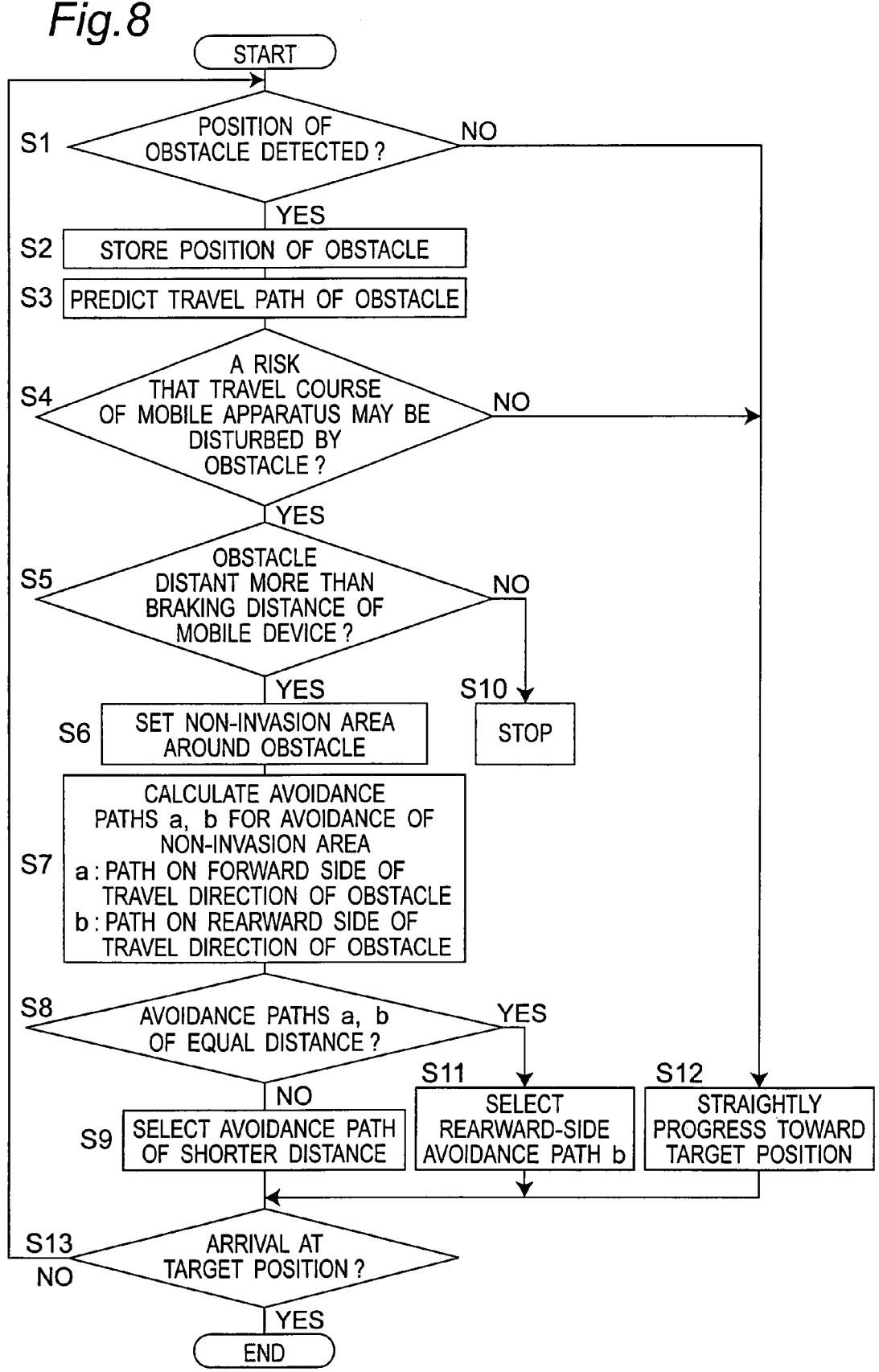
FIG. 8 is a flowchart of an algorithm of Embodiment 1.

FIG. 8 is a flowchart of an algorithm of Embodiment 1.

Referring to FIG. 8, first, a position of the obstacle 3 around the mobile apparatus 1 is detected at step S1. More specifically, environment information M1 is acquired by the distance sensor 2 included in the mobile apparatus 1 and, based on the acquired environment information M1, it is decided by the object presence/absence decision unit 52 whether or not the obstacle 3 is present within the sensing area 4. If it is decided at step S1 that no obstacle 3 is present within the sensing area 4, then the travel control on the mobile apparatus 1 is performed at step S12 so that the mobile apparatus 1 straightly progresses to the target position 9. Also, it is decided at step S1 that the obstacle 3 is present within the sensing area 4, then coordinates of an area R in which the obstacle 3 is present are stored as relative position information M2 as to the obstacle 3 in the storage unit 63 by the object presence/absence decision unit 52 at step S2.

Subsequently at step S3, by looking up to the relative position information M2 stored in the storage unit 63, under which the obstacle 3 has just before been present, and by comparing this just-before relative position information M2 and the current-time relative position information M2 with each other, it is decided whether or not the obstacle 3 will approach the mobile apparatus 1 or the travel course of the mobile apparatus 1. More specifically, relative position information M2 at a time point before the current time point and relative position information M2 at the current time point are compared with each other by the object relative-position prediction unit 53, by which travel direction and travel velocity of the obstacle 3 are calculated. A result of such calculation is object relative-position prediction information M3 for predicting a relative position change of the obstacle 3 and the mobile apparatus 1. Next, at step S4, based on the object relative-position prediction information M3 calculated above, it is decided by the travel-inhibition prediction unit 54 whether or not there is a risk that the obstacle 3 may travel so as to disturb the travel of the mobile apparatus 1, and risk information M4, which is the decision result information, is created.

If it is decided based on the risk information M4 that there is no risk that the travel course of the mobile apparatus 1 may be disturbed by the obstacle 3, the mobile apparatus 1 is controlled for its travel at step S12 so as to straightly progress to the target position 9.

Meanwhile, if it is decided at step S4 that there is a risk that the travel course of the mobile apparatus 1 may be disturbed by the obstacle 3, it is decided by the travel-permission decision unit 55 at step S5 whether or not the position of the obstacle 3 is distant more than the braking distance of the mobile apparatus. It is noted that the braking distance is of a value that depends on weight or velocity of the mobile apparatus. If it is decided at step S5 that the obstacle 3 is not distant more than the braking distance, the mobile apparatus 1 is stopped at step S10. More specifically, travel change information M5 for stopping the mobile apparatus 1 is created by the travel-permission decision unit 55, the resulting travel change information M5 is inputted to the control unit 61, by which stop control for the mobile apparatus 1 is exerted.

It is decided at step S5 that the obstacle 3 is distant more than the braking distance, a non-intrusion area G is set around the obstacle 3 by the travel-permission decision unit 55 at step S6. Next, at step S7, paths 'a', 'b' for the obstacle 3 to avoid the non-intrusion area G are calculated. Such avoidance paths 'a', 'b' are an example of the travel change information M5 and calculated by the travel-permission decision unit 55. In this case, the avoidance path 'a' is an avoidance path on the forward side of the travel direction of the obstacle 3, and the avoidance path 'b' is an avoidance path on the rearward side of the travel direction of the obstacle 3. It is noted that in the mobile apparatus 1 of this Embodiment 1, the travel-permission decision unit 55 functions as a first area setting unit.

Further, the travel-permission decision unit 55 makes a decision as to selection between the avoidance paths 'a', 'b' calculated above. More specifically, it is decided at step S8 whether or not the avoidance paths 'a', 'b' are equal in distance to each other. If their distances are equal to each other, the path 'b', which is a path on the rearward side of the travel direction, is selected at step S11. In the case where the distances are equal to each other, selecting a path on the rearward side of the travel direction of the obstacle 3 as shown above makes it possible to prevent impartment of the feeling of uneasiness or oppression to a person. Meanwhile, if it is decided at step S8 that the distances of the avoidance paths 'a', 'b' are different from each other, an avoidance path that is shorter in distance is selected at step S9. The travel-state changing unit 57 inputs information as to the avoidance path selected in this way as travel change information M5 to the control unit 61. Then, a control command M6 is inputted from the control unit 61 to the drive unit 62, by which avoidance control for the mobile apparatus 1 against the obstacle 3 is exerted.

After the travel control is exerted on the mobile apparatus 1 at step S9, S11 and S12, it is decided by the target-position arrival decision unit 56 at step S13 whether or not the mobile apparatus 1 has arrived at the target position 9. If it is decided that the mobile apparatus 1 has not arrived, processes of steps S1 to S12 are performed in sequence. Meanwhile, if it is decided by the target-position arrival decision unit 56 that the mobile apparatus 1 has arrived at the target position 9, the travel control on the mobile apparatus 1 is terminated.

In this case, the distance sensor 2 may be implemented by a noncontact-type sensor capable of acquiring distance information by using, for example, a laser radar or an ultrasonic sensor. The laser radar can accomplish with high accuracy the detection as to which direction the obstacle is present toward within its detection range, while the ultrasonic sensor is high in detection accuracy to substances that do not reflect light, such as glass. Those sensors differ in properties from each other and so using both in combination allows their own information to be compensated with each other.

The control command M6 is outputted to the drive unit 62 so as to avoid the risk that the travel of the mobile apparatus 1 may be disturbed, by which the travel state of the mobile apparatus 1 is changed. In this connection, the traveling mechanism may be exemplified by wheel mechanisms or ambulatory mechanisms, whereas a drive mechanism capable of changing the travel state will do in this Embodiment 1. In the case of a wheel mechanism as an example, the position and velocity of the mobile apparatus 1 may be calculated from odometry information using encoder information.

Embodiment 2

The present invention may be embodied in other various modes. For instance, an obstacle avoidance method according to Embodiment 2 of the invention is a modification of Embodiment 1 so as to differ therefrom in the way of setting the non-intrusion area G. Hereinbelow, the way of setting the non-intrusion area G in Embodiment 2 will be described below with reference to the schematic view of FIG. 9.

A non-intrusion area G' set in this Embodiment 2 includes the collision preventing area G1 and a person's conscious area G3. The collision preventing area G1 is provided by adopting an area similar to that of Embodiment 1, and the person's conscious area G3 is provided according to a concept different from that of Embodiment 1.

Figure 9:
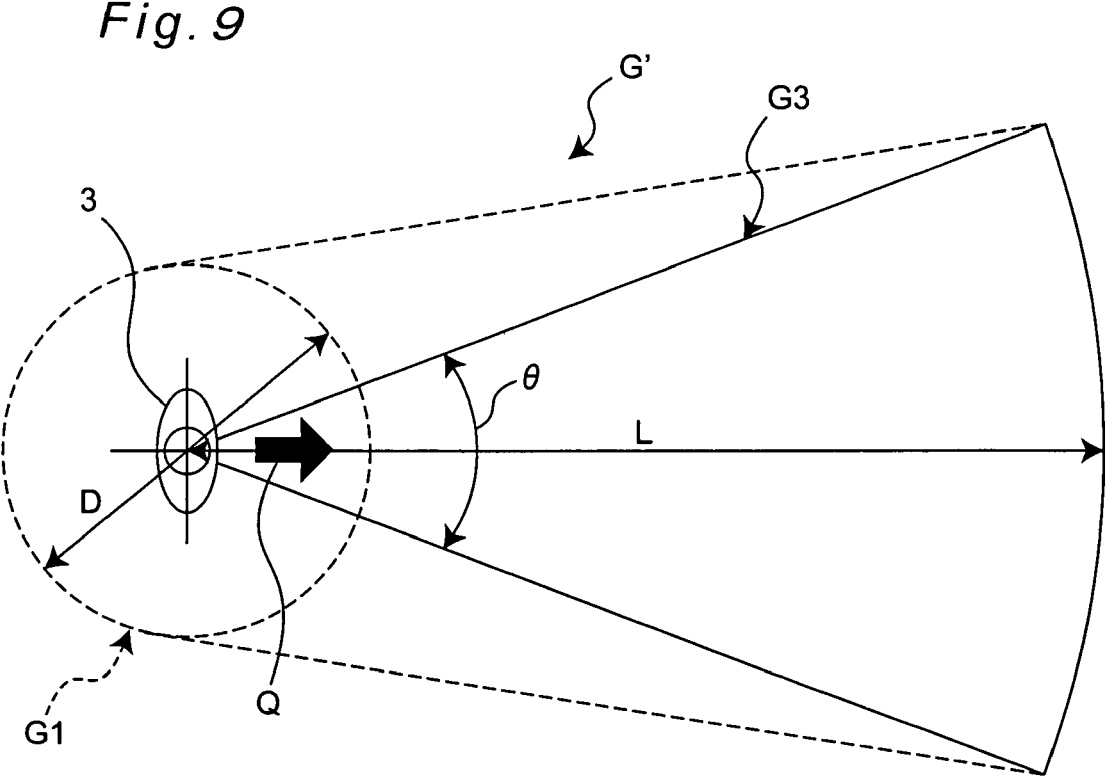
FIG. 9 is a schematic view showing a non-intrusion area in an obstacle avoidance method according to Embodiment 2 of the present invention.
Figure 10:
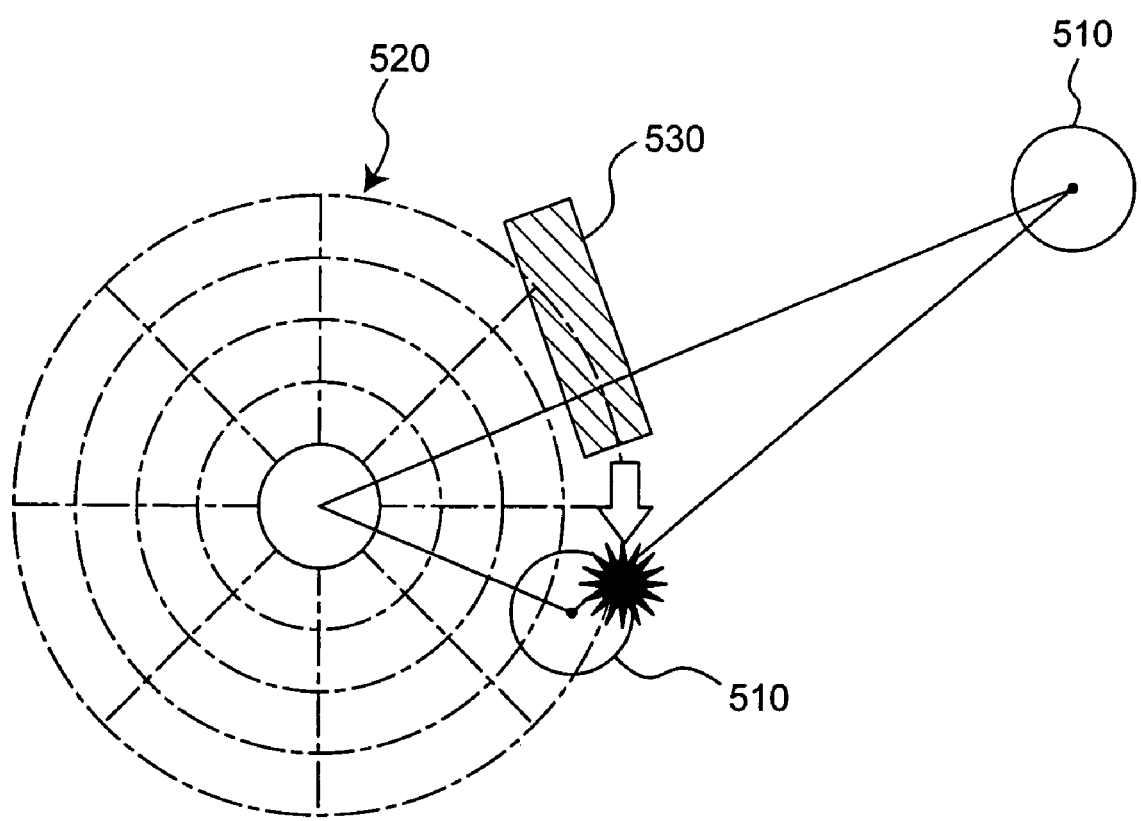
FIG. 10 is a schematic view of obstacle avoidance of a prior art.
Figure 11A:
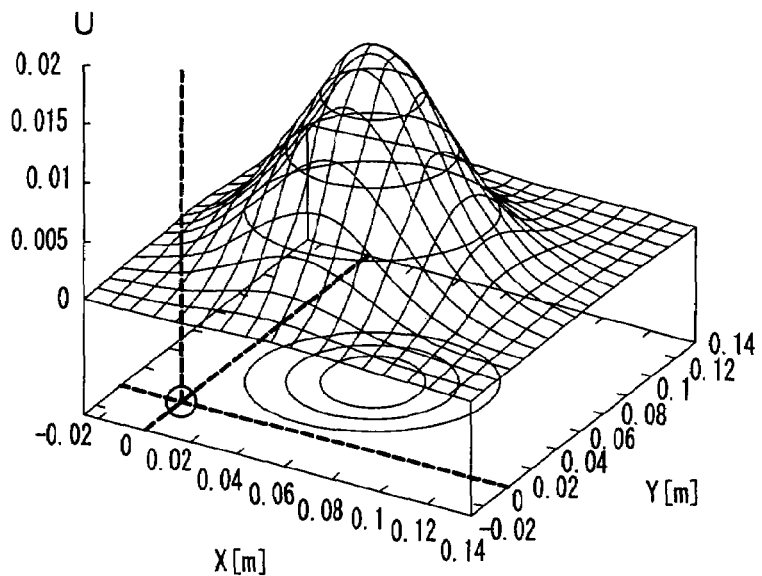
FIG. 11A is a schematic view showing a probability potential field of an obstacle in the obstacle avoidance of the prior art.
Figure 11B:
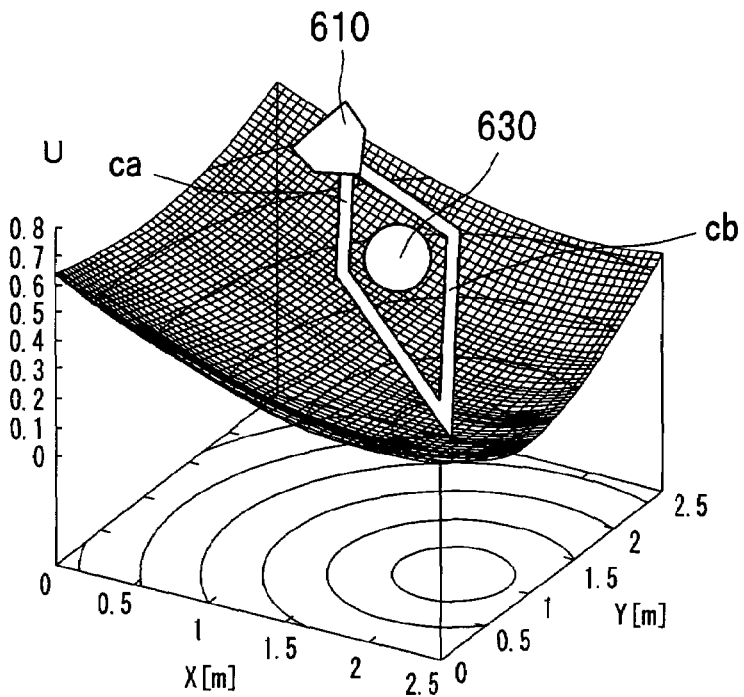
FIG. 11B is a schematic view showing an obstacle avoidance method using the probability potential field of FIG. 11A.
Figure 12A:
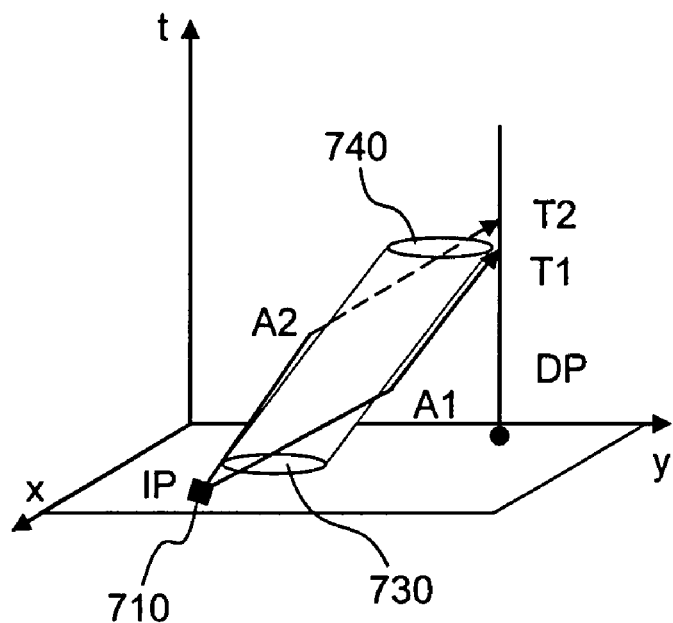
FIG. 12A is a schematic view (perspective view) showing an obstacle avoidance method of a prior art.
Figure 12B:
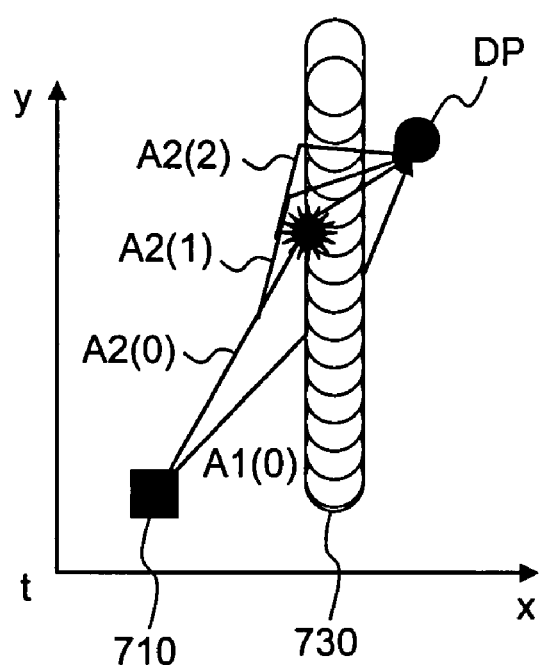
FIG. 12B is a schematic view (plan view) showing an obstacle avoidance method of a prior art.

More concretely, as shown in FIG. 9, the person's conscious area G3 is set as an area which has a person's effective viewing range (angle) θ by referencing a person's travel direction Q and a length L in the travel direction Q with the center of gravity of the person (obstacle) 3 taken as an origin. A region which is extended from both ends of a circular-arc portion of the person's conscious area G3 set as described above and which is surrounded by tangential lines fitted to the circumference of the collision preventing area G1 set around the person is aligned with the person's conscious area G3 and the collision preventing area G1, by which a non-intrusion area G' of this Embodiment 2 is set. For the setting of this non-intrusion area G', Equation (1) of the foregoing Embodiment 1 is used, and the effective viewing range θ is set by using Equation (6):

$$\theta = \alpha \times \exp(|Vh| \times \beta) \qquad (6)$$

where Vh>10.

Also, given θ (deg) and |Vh| (m/s), the non-intrusion area G' is set under the conditions that α=20 to 60 and β=−0.1 to −0.035.

The non-intrusion area G', which is set by using the person's effective viewing range θ as shown above, is characterized in that the length L of the area G' changes according to the relative velocity V between the mobile apparatus 1 and the obstacle 3, as well as that the viewing range θ changes according to the absolute velocity Vh of the obstacle 3.

The decision criterion of the obstacle avoidance method in this Embodiment 2, and the block configuration of information processing in the mobile apparatus 1, are similar to those of the foregoing Embodiment 1 and so their description is omitted.

From the above description, according to the individual embodiments, for avoidance of a traveling obstacle by the mobile apparatus, a non-intrusion area is set in consideration of a relative relationship between the mobile apparatus and the obstacle as well as the absolute travel direction and travel velocity of the obstacle, and avoidance control is exerted so that the set area is avoided, thus making it possible to prevent the mobile apparatus from repetitively performing the avoidance operation. Accordingly, a mobile apparatus endowed with an obstacle avoidance function of enhanced safety can be implemented. Further, in such an obstacle avoidance method, since a non-intrusion area is set so as to have a configuration elongated along the travel direction of the obstacle around the obstacle and since the mobile apparatus is subjected to travel control so as to avoid the non-intrusion area, there can be realized an obstacle avoidance method that makes it possible, e.g. for an obstacle which is a person, to keep the person from bearing the feeling of uneasiness or oppression, or to reduce the feeling of uneasiness or oppression to a great extent. In particular, setting a narrow, long non-intrusion area as described above on the forward side of the travel direction with the person's conscious region included makes it possible to effectively realize an obstacle avoidance method that keeps the person from the feeling of uneasiness or the like. The non-intrusion area G is so formed that its configuration is elongated in the forward direction more and more with increasing velocity of the obstacle 3. A more flexible, safer obstacle avoidance method can be implemented by setting only the collision preventing area G1 for cases in which the obstacle 3 is at rest, and by setting the conscious area G2 in combination as the obstacle 3 travels along.

It is to be noted that, by properly combining the arbitrary embodiments of the aforementioned various embodiments, the effects possessed by them can be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

According to the obstacle avoidance method of the present invention, particularly for cases in which the obstacle is a person, there can be realized such avoidance travel as will not impart the feeling of uneasiness or oppression to the person. Therefore, the invention is adaptable to automatic carts, transfer robots and the like, in home-use living environments such as households, hotels, golf courses, airports and the like.

The entire disclosure of Japanese Patent Application No. 2006-215295 filed on Aug. 8, 2006, and Japanese Patent Application No. 2007-170086 filed on Jun. 28, 2007 including specification, claims, drawings, and summary are incorporated herein by reference in its entirety.

What is claimed is:

1. An obstacle avoidance method comprising:
   acquiring information as to relative movement of an obstacle with respect to a mobile apparatus, the information being acquired by a sensor mounted on the mobile apparatus and including a velocity of the obstacle;
   calculating a travel path and a travel direction of the obstacle based on the information;
   setting a first area around the obstacle, the first area having a configuration which is longer in a forward direction along the travel direction of the obstacle than in a direction perpendicular to the travel direction;
   changing a ratio of a length of the first area in the travel direction to a length in a direction perpendicular to the travel direction according to the velocity of the obstacle; and
   controlling the mobile apparatus as to avoid the first area, wherein the length in the travel direction is increased relative to the perpendicular direction as the velocity of the obstacle increases.

2. The obstacle avoidance method of claim 1, wherein the acquiring of the information as to the relative movement of the obstacle includes sensing a relative distance, a relative velocity and a relative direction with respect to the obstacle by the sensor mounted on the mobile apparatus.

3. The obstacle avoidance method of claim 1, wherein the controlling the mobile apparatus includes calculating path lengths of a forward-side path and a rearward-side path, respectively, of the travel direction of the obstacle and selecting a travel path for the mobile apparatus that is the shorter of the path length of the forward-side path and the path length of the rearward-side path.

4. The obstacle avoidance method of claim 1, wherein the controlling the mobile apparatus includes calculating path lengths of a forward-side path and a rearward-side path, respectively, of the travel direction of the obstacle, and when the path length of the forward-side path and the path length of the rearward-side path are equal, the rearward-side path is selected as a travel path for the mobile apparatus.

5. The obstacle avoidance method of claim 1, further comprising:
   deciding whether or not a direction in which the obstacle acquires image information is directed toward the mobile apparatus, and
   changing a longitudinal direction of the first area to the direction toward the mobile apparatus to reset the first area when the direction in which the obstacle acquires image information is directed toward the mobile apparatus.

6. An obstacle-avoidable mobile apparatus comprising:
   a relative movement information acquisition unit having a sensor mounted on the mobile apparatus, the relative movement information acquisition unit acquiring information as to relative movement of an obstacle with respect to the mobile apparatus and containing information as to a velocity of the obstacle;
   a first area setting unit for setting a first area around the obstacle, the first area having a configuration which is longer in a forward direction along a travel direction of the obstacle than in a direction perpendicular to the travel direction by calculating a travel path and a travel direction of the obstacle based on the information acquired by the relative movement information acquisition unit; and
   a travel control unit for controlling the mobile apparatus so that the first area set by the first area setting unit is avoided,
   wherein the first area setting unit sets the first area by changing a ratio of a length of the first area in the travel direction to a length in a direction perpendicular to the travel direction according to the velocity of the obstacle, and
   wherein the first area setting unit sets the first area such that the length in the travel direction is increased relative to the perpendicular direction as the velocity of the obstacle increases.

7. The obstacle-avoidable mobile apparatus as defined in claim 6, wherein the sensor detects a relative distance, a relative velocity and a relative direction with respect to the obstacle as information as to the relative movement.

* * * * *